Figure 1:
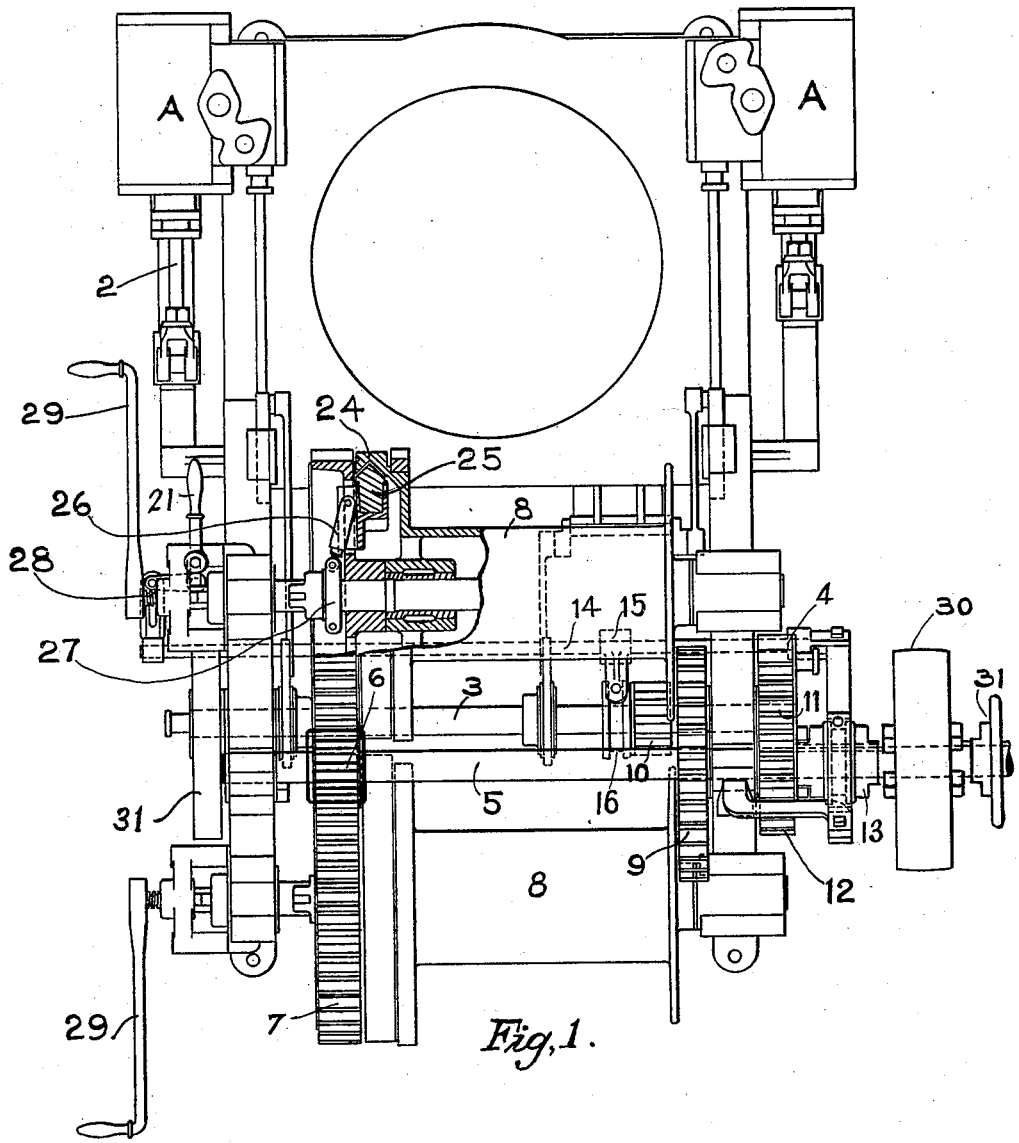

(No Model.) 2 Sheets—Sheet 1.

O. CROSBY.
VARIABLE SPEED HOISTING ENGINE.

No. 595,671. Patented Dec. 14, 1897.

WITNESSES: INVENTOR
Oliver Crosby
BY
T. D. Merwin
ATTORNEY (No Model.) 2 Sheets—Sheet 2.
O. CROSBY.
VARIABLE SPEED HOISTING ENGINE.
No. 595,671. Patented Dec. 14, 1897.
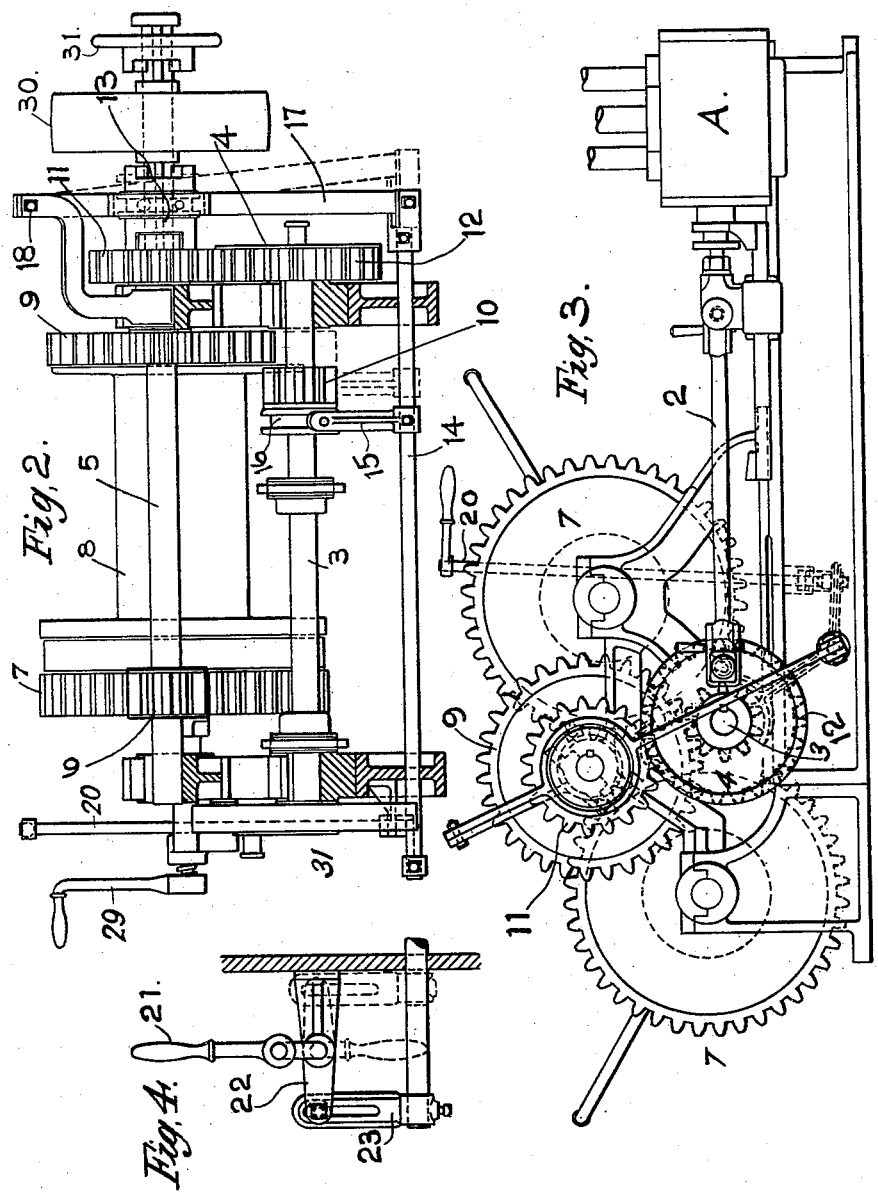

UNITED STATES PATENT OFFICE.

OLIVER CROSBY, OF ST. PAUL, MINNESOTA.

VARIABLE-SPEED HOISTING-ENGINE.

SPECIFICATION forming part of Letters Patent No. 595,671, dated December 14, 1897.

Application filed January 16, 1897. Serial No. 619,444. (No model.)

*To all whom it may concern:*

Be it known that I, OLIVER CROSBY, of St. Paul, Ramsey county, Minnesota, have invented certain Improvements in Variable-Speed Hoisting-Engines, of which the following is a specification.

My invention relates to improvements in hoisting-engines, its object being to provide improved means for varying the speed given thereby to the connected gearing and machinery; and it consists in the features of construction hereinafter set forth and claimed.

In the accompanying drawings, forming part of this specification, Figure 1 is a plan view of my improved engine with certain parts removed. Fig. 2 is an end elevation of the same, the front drum being removed the better to show the gearing. Fig. 3 is a side elevation of the same with the pulley and clutch removed, and Fig. 4 is a detail of the gear-shifting mechanism.

In the drawings let A represent the engine; 2, its pitman; 3, the crank-shaft, driven thereby by means of the crank-disks 4 and 31.

5 is the driven intermediate shaft, provided with the pinion 6, engaging with the gears 7 of the frictionally-driven drums 8. The shaft 5 carries the large gear 9, adapted to be engaged by the pinion 10, slidable upon the shaft 3. It also carries the smaller loose gear 11, which meshes with the gear 12 of the crank-disk 4 and serves to drive the shaft 5 when locked thereon by means of the double clutch 13. This clutch and the pinion 10 are controlled by the slidable bar or shaft 14, so as to be alternately thrown into engagement with the gears 9 and 11, the shaft 14 having an arm 15, which engages a circumferential groove 16 upon the pinion 10, and being also pivotally connected to the link 17, the other end of which has the fixed pivotal support 18, said link being connected to and adapted to shift the clutch 13. By the shifting of the bar 14, therefore, it is evident that the speed imparted to the shaft 5 is variable, it being driven either by the pinion 10 and gear 9 or by the gears 12 and 11.

The shifting bar or shaft 14 is operated by means of the crank-shaft 20, having suitable bearing-support and having an operating-handle 21 and a crank-arm 22, which works in a slotted arm 23, carried by the shaft 14, as illustrated in Fig. 4, the crank being thrown to or past dead-center in shifting the bar, so as to lock the same.

The hoisting-drums are driven by means of clutches engaging hollow friction-drums 24, having an interior wedge-shaped groove, with which work the shoes 25, operated by means of the arms 26 upon the clutch-sleeve 27, which in turn is operated by means of the screw 28, having an operating-arm 29, whereby either drum may be thrown into gear at will.

In order to furnish driving connection for a belt, I mount loosely upon the end of the shaft 5 a belt-pulley 30, with which the clutch 13 engages and locks it to the shaft when it is thrown out of engagement with the gear 11. Thus the engine may be used to drive the belt or to operate the hoisting-drums, the latter at either of the two speeds for which the connections are adapted.

Should it be desired to run the belt-pulley at higher speed, it can be locked on the shaft by means of the clutch 31 when the clutch 13 is out of engagement with it.

I claim—

1. In a hoisting-engine, in combination, the hoisting-drum, the driving-shaft, the intermediate shaft, the gear-and-clutch mechanism for connecting it to the drum, the alternate differential-speed gears between said shafts, and the common shifting mechanism by means of which either set of said gears is thrown out of connection as the other is thrown in.

2. In a hoisting-engine, in combination the driving-shaft, the driven shaft, the double-faced clutch upon the driven shaft, the loose gear upon one side of said clutch, and the loose belt-pulley upon the other, adapted to be alternately engaged by said clutch.

3. In a hoisting-engine, the combination with the driven and driving shafts, of the fixed gears upon each adapted respectively to engage, the one a slip-gear, and the other a loose, clutch-driven gear upon the other shaft, the slidable bar, the connections between said bar and slip-gear and clutch whereby the sliding of the bar in one direction throws one of said parts into gear and the other out, and the reverse movement of the bar throws the first-named part out of gear, and the second into gear, and the crank for throwing said slidable bar, adapted to lock the same at either extreme position by passing the dead-center.

4. In a hoisting-engine, the combination with the driving-shaft and the parallel driven shaft, of the fixed gear upon said driving-shaft, the loose gear upon said driven shaft, the sliding clutch on said driven shaft adapted to engage said loose gear, the fixed gear upon the driven shaft, and the slidable gear upon the driven shaft adapted to be thrown into or out of engagement with said fixed driven-shaft gear, the reciprocating shifting-bar, the arm upon said bar engaging said slidable gear upon the driving-shaft, the lever operatively connected to said shifting-bar, and said clutch, said parts being so arranged that said slidable gear and clutch are thrown, the one into gear when the other is thrown out of gear, the offset slotted arm upon said shifting-bar, and the crank engaging said slotted arm, and adapted to shift said bar from one extreme position to the other, and to lock the same in either such position by assuming the dead-center position.

5. In a hoisting-engine, in combination, the driving-shaft, the parallel driven shaft, the belt-pulley upon the driven shaft, the hoisting-drum, the friction-clutch detachably connecting said drum with said driven shaft, the variable-speed gear intermediate of the driving and driven shafts, and the common shifting attachment for throwing off one speed connection when the other is thrown on.

In testimony whereof I affix my signature in presence of two witnesses.

OLIVER CROSBY.

Witnesses:
T. D. MERWIN,
MINNIE L. THAUWALD.